(No Model.)
W. BELL.
SHEAF CARRIER FOR GRAIN HARVESTERS.
No. 382,404. Patented May 8, 1888.
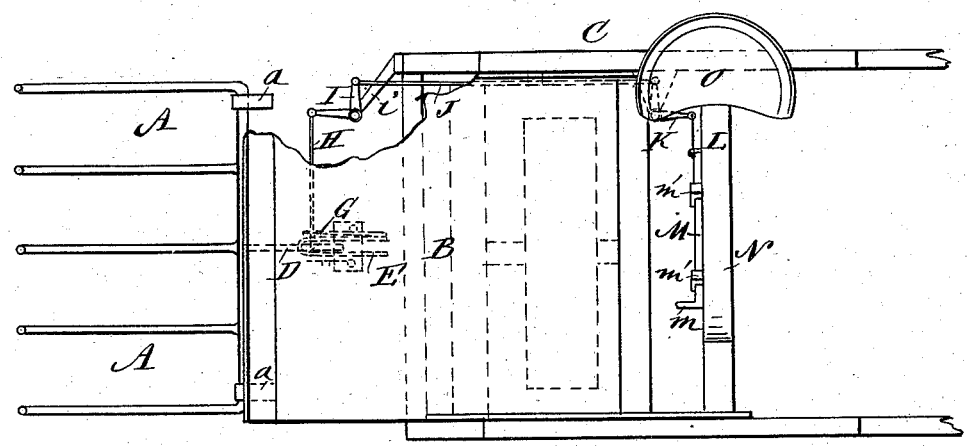
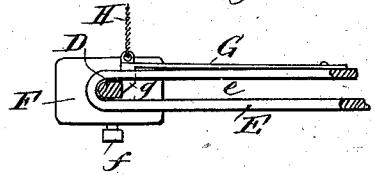
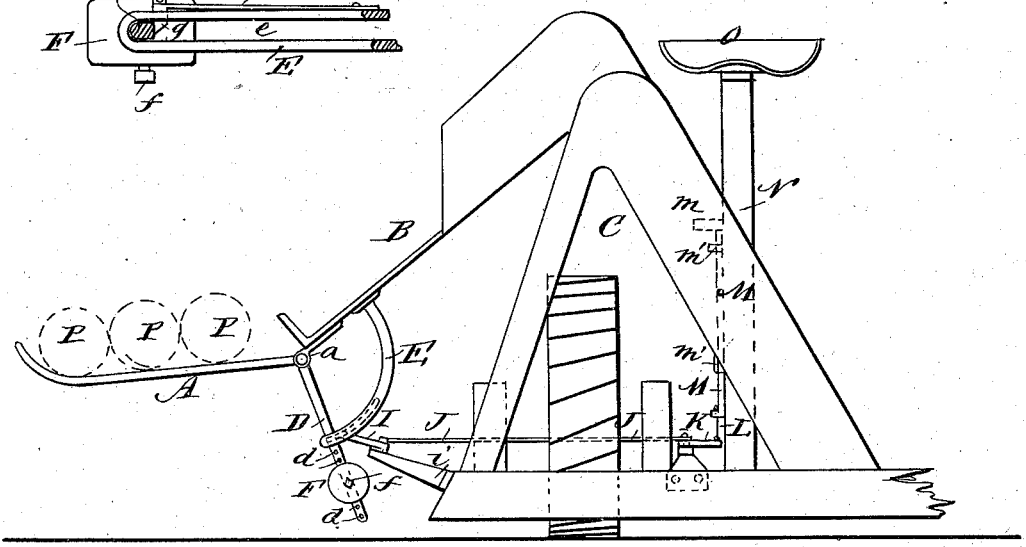
WITNESSES:
C. Neveux
C. Sedgwick.
INVENTOR:
W. Bell
BY Munn & Co
ATTORNEYS.

UNITED STATES PATENT OFFICE.

WILLIAM BELL, OF MORDEN, MANITOBA, CANADA.

SHEAF-CARRIER FOR GRAIN-HARVESTERS.

SPECIFICATION forming part of Letters Patent No. 382,404, dated May 8, 1888.

Application filed May 3, 1887. Serial No. 236,951. (No model.)

*To all whom it may concern:*

Be it known that I, WILLIAM BELL, of Morden, in the Province of Manitoba, Dominion of Canada, have invented a new and Improved Sheaf-Carrier for Grain-Harvesters, of which the following is a full, clear, and exact description.

My invention relates to a sheaf-carrier for grain-harvesters which may be applied at any time to any machine of this class, and is simple and inexpensive in construction, and may be conveniently operated by the harvester attendant for dumping the sheaves to the ground, without disarranging either properly tied or mistied sheaves, thereby preventing waste of grain and saving considerable time and labor in harvesting the crop.

The invention consists in certain novel features of construction of the sheaf-carrier, and in its combination with the grain-harvester and trip mechanism thereon, all as hereinafter fully described and claimed.

Reference is to be had to the accompanying drawings, forming a part of this specification, in which similar letters of reference indicate corresponding parts in all the figures.

Figure 1 is a plan view of parts of a self-binding harvester with my improved sheaf-carrier applied, the binding-table of the harvester being partly broken away. Fig. 2 is a front view of parts of the harvester with the carrier applied and the sheaves shown on the carrier in dotted lines, and Fig. 3 is an enlarged detail plan view, partly in section, of part of the carrier-arm guide and the arm and its latch.

The sheaf-carrier is made with a fork-shaped support or table, A, which receives and holds the bound sheaves or bundles delivered to it from the binding-table B of a harvester, C. (Shown only in part.) The sheaf carrier or tray A is journaled in suitable strap-bearings or boxes, *a a*, which are fixed to the outer end and under side of the binding-table B, and over which the sheaves will pass or roll sidewise directly onto the sheaf carrier or tray A from the table.

To the cross-bar of the sheaf carrier or tray an inclined arm, D, is fixed, and this arm passes through a slot, *e*, made in the lower end of a curved guide-bar, E, which is fixed to the under side of the binding-table. Below the guide-bar E the arm D is provided with a weight, F, which may be set at different distances from the cross-bar or axis of the sheaf carrier or tray by means of a pin, *f*, passed through the weight and into any one of a series of holes, *d*, made in the arm, to counterbalance the sheaf carrier or tray against the weight of the sheaves on it, and to bring the sheaf carrier or tray back into position to receive tied bundles after it has been lowered or tilted to discharge sheaves from it to the ground, as presently explained.

At one side of the guide-bar E a spring-latch, G, is fixed, said latch having an inclined head, *g*, which enters the guide-slot *e*, and is adapted to lock or retain the counterbalance-arm D at the lower end of the slot. To the latch-head is connected one end of a rod, H, the other end of which is attached to one arm of an elbow-lever, I, which is pivoted to a bracket or arm, *i*, on the harvester-frame, and the other arm of the lever is connected to one end of a rod, J, which extends laterally along the harvester-frame and is attached to one arm of an elbow-lever, K, which is fulcrumed to a bracket on the harvester-frame. To the other arm of the lever K a cord or rod, L, is attached, and this cord or rod is connected to the end of a bar, M, which is fitted in suitable guides, *m'*, on the standard N of the seat O of the harvester, and has a treadle-bar or arm, *m*, which may be operated by the foot of the attendant occupying the seat O for withdrawing the latch-head *g*, and allowing the sheaf carrier or tray A to tilt on its bearings *a* for discharging the sheaves.

The operation of the device is very simple and effective, and as follows: The sheaves are discharged sidewise from the binding-table of the harvester directly onto the sheaf carrier or tray A, which is then locked in nearly horizontal position by the latch-head *g*, projected behind the support-arm D, as shown in Fig. 3 of the drawings. When the desired number of sheaves or bundles are deposited onto the sheaf carrier or tray A, and, as indicated by dotted lines at P in Fig. 2 of the drawings, the attendant will operate the rod M with his foot and thereby draw on the cord L, the elbow-levers K I, and the rods J H, and withdraw the latch-head *g* and allow the superior weight of the sheaves P to tilt the sheaf carrier or tray A to dump the sheaves to the ground, whereupon the weight F will immediately swing the sheaf carrier or tray back again to its first position, the latch-head g being forced outward by the weighted arm D until the arm passes the latch, which then springs behind it to lock the sheaf carrier or tray in place to receive the next bound sheaves and hold them until the sheaf carrier or tray is again tripped by the attendant operating the bar M, as above described.

It will be noticed that the direct discharge sidewise of the sheaves or bundles from the binding-table onto the sheaf carrier or tray A, and the sidewise discharge of the sheaves from the sheaf carrier or tray to the ground tends to prevent untying or loosening of the grain when properly tied by the harvester mechanism, and also that sheaves or bundles mistied or poorly tied by the binding or knotting mechanism of the harvester will not be disarranged when discharged onto the sheaf carrier or tray A, and thence to the ground, as is the case with sheaf-carriers or attachments onto which the grain is discharged endwise from the binding-table or an intermediate support, or from the binding-table to the ground; hence the grain, whether properly or improperly tied, will not be roughly handled or scattered, and there will be very little loss of the kernels onto the ground. Furthermore, should a sheaf fall from the binding-table before the sheaf carrier or tray A rises to horizontal position, the sheaf will pass directly down the sheaf carrier or tray to the ground and will not interfere with the rise of the sheaf carrier or tray to normal latched position.

Having thus fully described my invention, what I claim as new, and desire to secure by Letters Patent, is—

1. The combination, with the harvester binding-table, of the hinged sheaf carrier or tray having a pendent counterbalanced or weighted arm, a guide-bar fixed to the binding-table and through which plays the said arm, and the spring-latch applied to the guide-bar and adapted to hold the arm in such position as to retain the sheaf-carrier with its load in a horizontal position, substantially as set forth.

2. The combination of a sheaf carrier or tray A, hinged to the binding-table, B, a weighted arm, D, fixed to the sheaf carrier or tray, a guide-bar, E, fixed to the binding-table through which the arm plays, a latch, G g, mounted on and extending into said guide-bar and in the path of the movement of the said arm, a rod, H, connected to the latch, elbow-levers I K, fulcrumed on the harvester-frame, connections J L to the elbow-levers, and a treadle-bar, M, fitted to the harvester-frame and to which the cord or rod L is attached, substantially as described, for the purposes set forth.

WILLIAM BELL.

Witnesses:
ALEX. CRUICKSHANK,
HENRY J. PUGH.